United States Patent
Yin et al.

(10) Patent No.: US 9,003,189 B2
(45) Date of Patent: Apr. 7, 2015

(54) TRUSTED THIRD PARTY CLIENT AUTHENTICATION

(75) Inventors: Fenglin Yin, Lexington, MA (US); Jack Jianxiu Hao, Lexington, MA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 78 days.

(21) Appl. No.: 13/609,530

(22) Filed: Sep. 11, 2012

(65) Prior Publication Data

US 2014/0075188 A1 Mar. 13, 2014

(51) Int. Cl.
*H04L 9/32* (2006.01)
*G06F 21/10* (2013.01)
*H04L 29/06* (2006.01)
*H04L 29/08* (2006.01)

(52) U.S. Cl.
CPC .............. *G06F 21/10* (2013.01); *H04L 63/06* (2013.01); *H04L 63/0807* (2013.01); *H04L 67/146* (2013.01); *H04L 2463/101* (2013.01)

(58) Field of Classification Search
CPC ................................ G06F 21/10; G06F 21/41
USPC ................... 713/168, 150, 170, 182
See application file for complete search history.

(56) References Cited

U.S. PATENT DOCUMENTS

| | | | | |
|---|---|---|---|---|
| 5,754,547 A * | 5/1998 | Nakazawa | ..................... | 370/401 |
| 6,067,568 A * | 5/2000 | Li et al. | ..................... | 709/223 |
| 7,590,696 B1 * | 9/2009 | Odell et al. | ..................... | 709/206 |
| 7,953,979 B2 * | 5/2011 | Borneman et al. | ........... | 713/175 |
| 8,196,177 B2 * | 6/2012 | Hinton, I | ........................... | 726/1 |
| 8,271,632 B2 * | 9/2012 | Kobayashi et al. | ........... | 709/223 |
| 8,375,213 B2 * | 2/2013 | Borneman et al. | ........... | 713/175 |
| 8,607,054 B2 * | 12/2013 | Ramarathinam et al. | ..... | 713/172 |
| 2003/0061520 A1 * | 3/2003 | Zellers et al. | ................. | 713/202 |
| 2007/0192140 A1 * | 8/2007 | Gropper | .......................... | 705/3 |
| 2008/0072301 A1 * | 3/2008 | Chia et al. | ........................ | 726/8 |
| 2008/0275962 A1 * | 11/2008 | Kobayashi et al. | ........... | 709/218 |
| 2009/0165095 A1 * | 6/2009 | Ishikawa et al. | .................. | 726/4 |
| 2009/0288155 A1 * | 11/2009 | Joshi et al. | ....................... | 726/9 |
| 2010/0100924 A1 * | 4/2010 | Hinton | ............................. | 726/1 |
| 2010/0100925 A1 * | 4/2010 | Hinton | ............................. | 726/1 |
| 2010/0154046 A1 * | 6/2010 | Liu et al. | ........................... | 726/8 |
| 2011/0113092 A1 * | 5/2011 | Rakowski et al. | ............ | 709/203 |
| 2012/0144464 A1 * | 6/2012 | Fakhrai et al. | .................... | 726/6 |
| 2012/0151568 A1 * | 6/2012 | Pieczul et al. | .................... | 726/8 |
| 2012/0216268 A1 * | 8/2012 | Kassaei et al. | .................... | 726/9 |
| 2013/0007845 A1 * | 1/2013 | Chang et al. | ..................... | 726/4 |
| 2013/0283361 A1 * | 10/2013 | Rao et al. | .......................... | 726/7 |
| 2014/0075188 A1 * | 3/2014 | Yin et al. | ....................... | 713/168 |

* cited by examiner

*Primary Examiner* — Darren B Schwartz
*Assistant Examiner* — J. Brant Murphy

(57) ABSTRACT

A method includes receiving, at a video service provider system, a request for an online video session from a third party device with a security markup assertion language (SAML) token as an input, decrypting a SAML assertion in the SAML token with a private key associated with the video service provider system, validating the SAML assertion based on a third party public key associated with the third party STS, and retrieving a third party account user identifier and a device type. The method also includes identifying a link time based on the third party account user identifier, identifying a password change time (PCT) stamp associated with the service provider user account, and providing the online video session to the third party device in response to determining that the PCT stamp is not later than the link time.

20 Claims, 8 Drawing Sheets

| AUTH ID | PCN | DEVICE TYPE | LINK TIME |
|---|---|---|---|
| P3UID 1 | PCN A | DEVICE TYPE A | 6/24/2012 15:34 |
| P3UID 2 | PCN B | DEVICE TYPE A | 5/12/2011 12:12 |
| P3UID 3 | PCN C | DEVICE TYPE A | 5/14/2012 6:45 |
| P3UID 4 | PCN D | DEVICE TYPE B | 3/11/2010 6:07 |
| P3UID 5 | PCN E | DEVICE TYPE B | 4/02/2011 17:55 |
| P3UID 6 | PCN F | DEVICE TYPE B | 12/25/2011 19:23 |
| P3UID 7 | PCN G | DEVICE TYPE C | 01/10/2012 12:00 |

FIG. 7

TRUSTED THIRD PARTY CLIENT AUTHENTICATION

BACKGROUND

Video service providers currently provide multiple services and programs, including cable television, network television, and video on demand, to their customers. In some instances, individual customers may receive combinations of these multiple services from a single video service provider.

Video service providers may protect video services using security assertion markup language (SAML), which is a standard for exchanging authentication and authorization information between an identity provider, such as a security token service, and a service provider. Security token services are known to transfer security information in SAML assertions, which may contain statements (including authentication statements, attribute statements, and authorization decision statements) that allow the service providers to make determinations with regard to a requesting party.

BRIEF DESCRIPTION OF THE DRAWINGS

FIG. 7 is a diagram of an exemplary account link table; and

DETAILED DESCRIPTION OF PREFERRED EMBODIMENTS

The following detailed description refers to the accompanying drawings. The same reference numbers in different drawings may identify the same or similar elements. Also, the following detailed description is exemplary and explanatory only and is not restrictive of the invention, as claimed.

Systems and/or methods described herein may provide authentication of trusted third party users of third party devices at an online video platform associated with a service provider entity. Third party devices may be user devices that are formatted by, or associated with a third party entity. The online video platform may assign a trusted status to the third party device (i.e., communications from the third party device are presumed to be accurate and secure) based on a relationship with the third party entity (e.g., business relationship). For example, third party user credentials may be used to authenticate the third party device for access to video content provided to the third party device. Consistent with some embodiments, an authentication architecture is described for trusted third party users of third party devices in which service is provided in association with a partner entity (of the service provider entity). Additionally, related management of a one-time account link between the third party user account and the online video platform is described.

Figure 1:
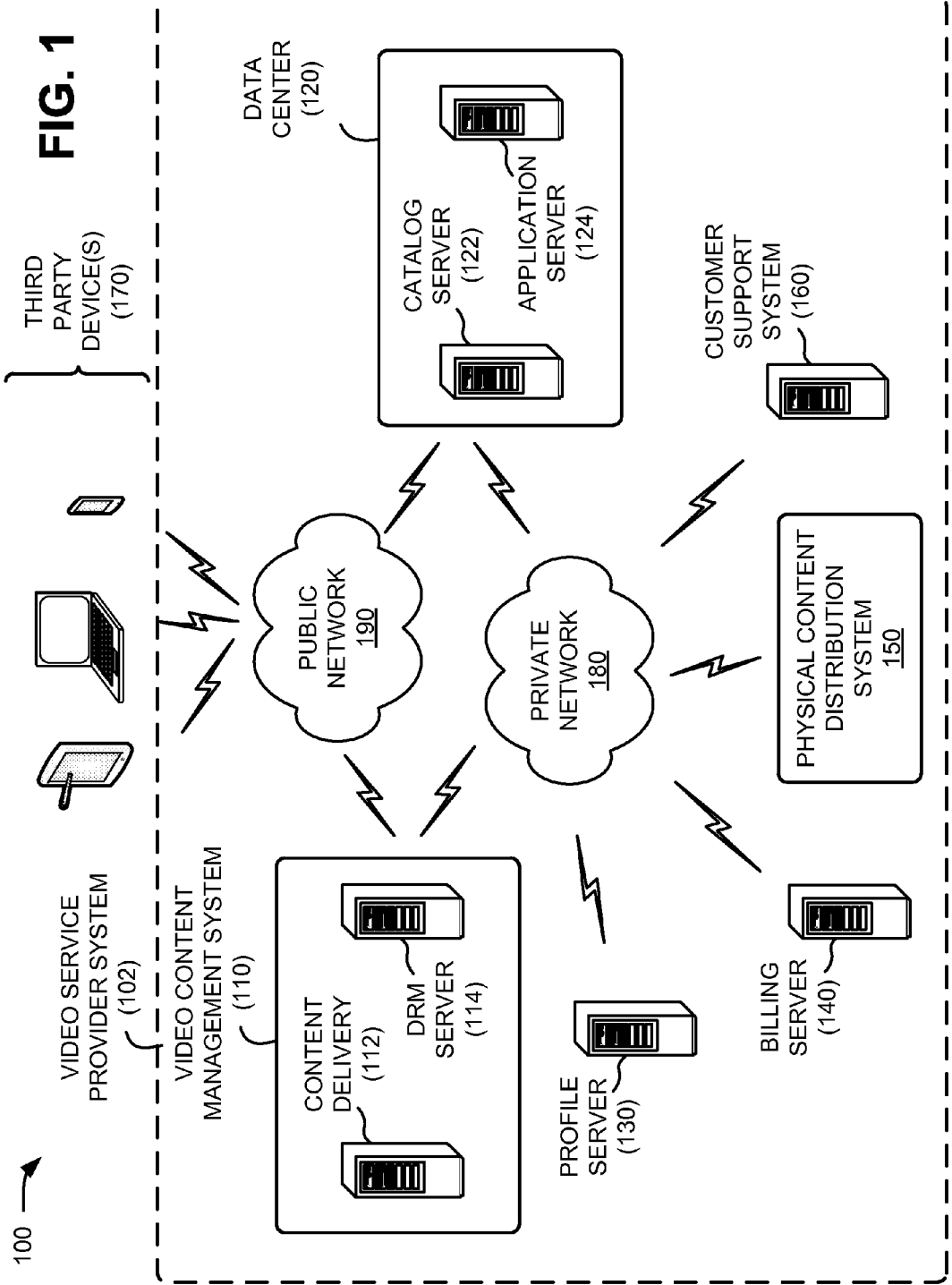
FIG. 1 is an exemplary network in which systems and/or methods described herein may be implemented.

FIG. 1 is an exemplary network 100 in which systems and/or methods described herein may be implemented. As illustrated, network 100 may include a video service provider system 102 and third party devices 170, which may receive an online video service from video service provider system 102. Video service provider system 102 may include video content management system (VCMS) 110, a data center 120, a profile server 130, a billing server 140, a physical content distribution system 150, a customer support system 160, a private network 180, and a public network 190. The particular arrangement and number of components of network 100 shown in FIG. 1 are illustrated for simplicity. In practice there may be more VCMSs 110, data centers 120, profile servers 130, billing servers 140, physical content distribution systems 150, customer support systems 160, third party devices 170, and/or networks 180/190. Components of network 100 may be connected via wired and/or wireless links.

Third party devices 170 may enable a user to receive video content (i.e., an online video session) from video service provider system 102. Third party devices 170 may be end user devices that are formatted by, or associated with a third party entity. The third party entity may be a manufacturer of, or other organization associated with, third party device 170. Third party devices 170 may include, for example, a gaming console, a personal communications system (PCS) terminal (e.g., a smartphone that may combine a cellular radiotelephone with data processing and data communications capabilities), a tablet computer, a personal computer, a laptop computer, an Internet television, or other types of computation or communication devices.

Video service provider system 102 may be a core network that provides online video service and are affiliated with a service provider entity (e.g., a commercial video service provider). Video service provider system 102 may provide an online video service to third party devices 170 in association with a partner entity (i.e., a digital service reseller that acts as a partner of the video service provider entity).

VCMS 110 may aggregate content, process content, and distribute content. In one implementation, VCMS 110 may include a content delivery system 112 and a digital rights management (DRM) server 114. VCMS 110 may aggregate content and transcode content into a digital format suitable for consumption on particular third party devices 170. For example, VCMS 110 may include a transcoding device to convert an audio, video, multimedia or graphic file from one format to another (e.g., from one bit rate to another bit rate, from one resolution to another, from one standard to another, from one file size to another, etc.). VCMS 110 may also encrypt data and communicate with third party devices 170 through DRM server 114 to enforce digital rights.

Content delivery system 112 may deliver digital content from a backend server to third party devices 170. In one implementation, content delivery system 112 may include a streaming server that provides streaming data packets (e.g., via a streaming uniform resource locator (URL)) to third party devices 170 (e.g., via public network 190). In one implementation, a streaming URL may be session-based, such that each URL can be used only once for one third party device 170 for security purposes.

DRM server 114 may issue, validate, and/or enforce DRM licenses to a third party device client, such as an application running on one of third party devices 170. In implementations herein, DRM server 114 may communicate with third party device 170 to validate an authorization token in issuing a license for an application residing on third party device 170.

Data center 120 may manage the authorization, selection, and/or purchase of multimedia content by a user of third party device 170 (i.e., based on input associated with the user received from third party device 170). As shown in FIG. 1, data center 120 may include a catalog server 122 and an application server 124. In one implementation, data center 120 may be accessed by third party devices 170 via public network 190.

Catalog server 122 may provide a catalog of content for users (e.g., of third party devices 170) to order/consume (e.g., buy, rent, or subscribe). In one implementation, catalog server 122 may collect and/or present listings of content available to third party devices 170. For example, catalog server 122 may receive digital content metadata, such as lists or categories of content, from VCMS 110. Catalog server 122 may use the content metadata to provide currently-available content options to third party devices 170. Catalog server 122 may provide the content metadata to third party device 170 directly or may communicate with third party device 170 via application server 124.

Figure 8:
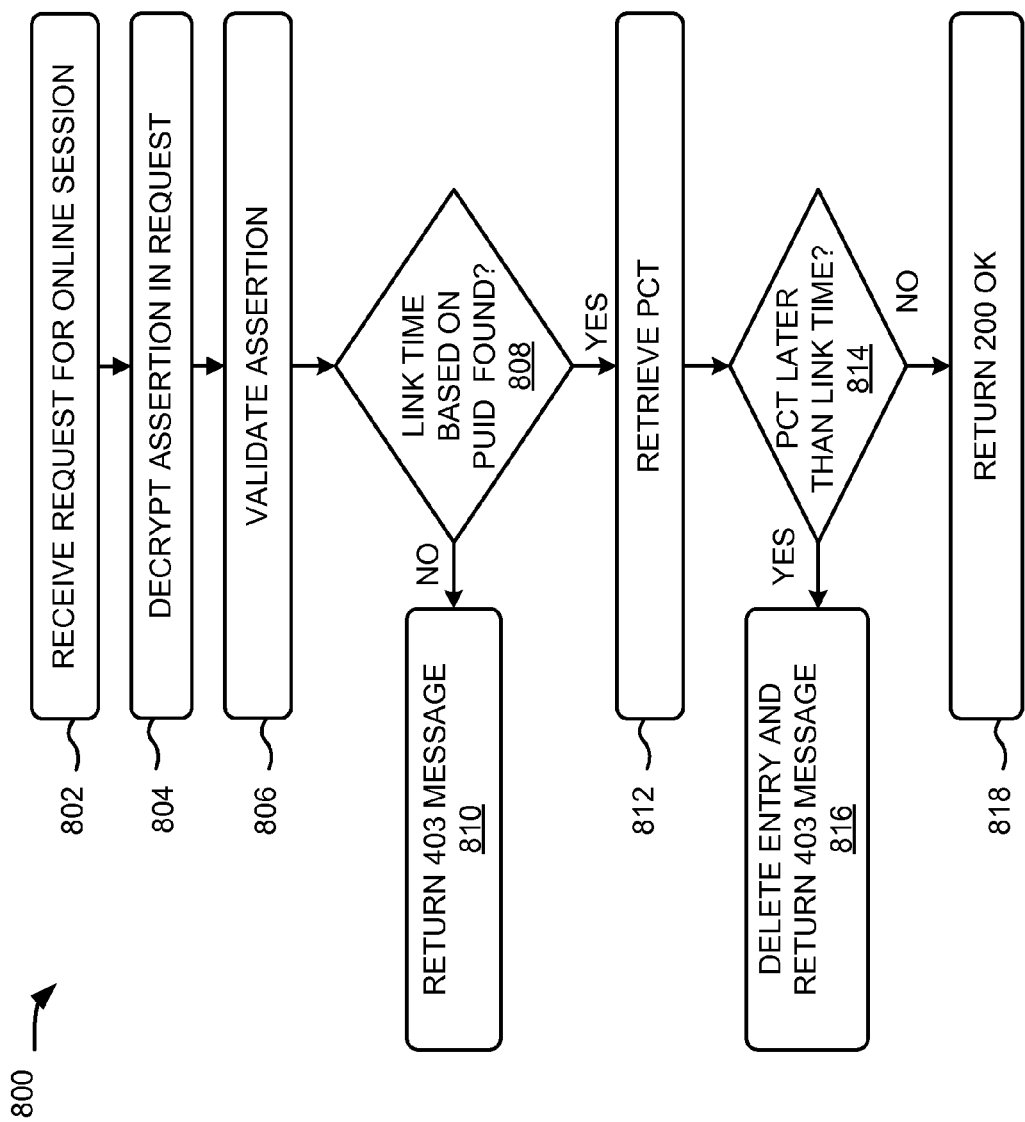
FIG. 8 is a flow chart of an exemplary process for authentication of a trusted third party according to an implementation described herein.

Application server 124 may provide a backend support system for mobile applications residing on third party devices 170. For example, application server 124 may permit third party device 170 to download an application that enables a user to find content of interest or play downloaded or streaming content. Application server 124 may provide digital content in association with VCMS 110. In one implementation, the interactions between application server 124 and third party device 170 may be performed using hypertext transfer protocol (HTTP) or secure HTTP (HTTPS) via public network 190. Application server 124 may provide authentication of third party devices 170 and enable management of a one-time account link for a trusted third party user, as described below with respect to signals flows 500 and 600 (FIGS. 5 and 6), and process 800 (FIG. 8).

Profile server 130 may store user profile information for users (e.g., users of third party devices 170). The user profile information may include various information regarding a user, such as login information (e.g., a user identifier and a password), billing information, address information, types of services to which the user has subscribed, a list of content purchased by the user, a list of video content rented by the user, a list of video content to which the user has subscribed, a user device identifier (e.g., a media player identifier, a mobile device identifier, a set top box identifier, a personal computer identifier) for third party device 170, a video application identifier associated with the video application obtained from application server 124, or the like. Application server 124 may use the user profile information from profile server 130 to authenticate a user and may update the user profile information based on the user's activity (e.g., with a user's express permission).

Billing server 140 may manage charging users for services provided via video service provider system 102. Billing server 140 may include, for example, a payment processing component, a billing component, and/or a settlement component. In some implementations, billing services may be performed by servers external to video service provider system 102 (e.g., billing servers for a partner entity or third party entity).

Physical content distribution system 150 may track availability of physical content (e.g., DVDs, Blu-ray discs, memory cards, etc.) and provide metadata relating to the physical content for inclusion in catalog information provided to users of third party devices 170. In one implementation, physical content distribution system 150 may also provide physical content information, such as location information, so that when a user wants to buy physical content, the system may direct the user to the nearest location for purchasing the physical content. Additionally, or alternatively, physical content distribution system 150 may generate or receive credit information for users (e.g., for cross-promotion purposes with a partner entity). For example, after a user of third party device 170 has purchased digital content or a subscription/rental of digital content, the user may be entitled to credits for obtaining a corresponding physical asset or vice versa.

Customer support system 160 may solicit and/or receive user feedback, questions, or credit-related requests.

Private network 180 may include, for example, one or more private IP networks that use a private IP address space. Private network 180 may include a local area network (LAN), an intranet, a private wide area network (WAN), etc. In one implementation, private network 180 may implement one or more Virtual Private Networks (VPNs) for providing communication between, for example, any of VCMS 110, data center 120, profile server 130, billing server 140, physical content distribution system 150, and/or customer support system 160. Private network 180 may be protected/separated from other networks, such as public network 190, by a firewall. Although shown as a single element in FIG. 1, private network 180 may include a number of separate networks.

Public network 190 may include a local area network (LAN), a wide area network (WAN), such as a cellular network, a satellite network, a fiber optic network, a private WAN, or a combination of the Internet and a private WAN, etc., that is used to transport data. Although shown as a single element in FIG. 1, public network 190 may include a number of separate networks that function to provide services to third party devices 170.

In implementations described herein, a third party device may be authenticated for access to a video service (provided in association with an online video platform) in instances in which access has been (separately) charged and validated. Billing functions and information (e.g., credit card information) may be implemented by another entity (e.g., an application may prompt the customer to enter credit card information after authentication).

Figure 2:
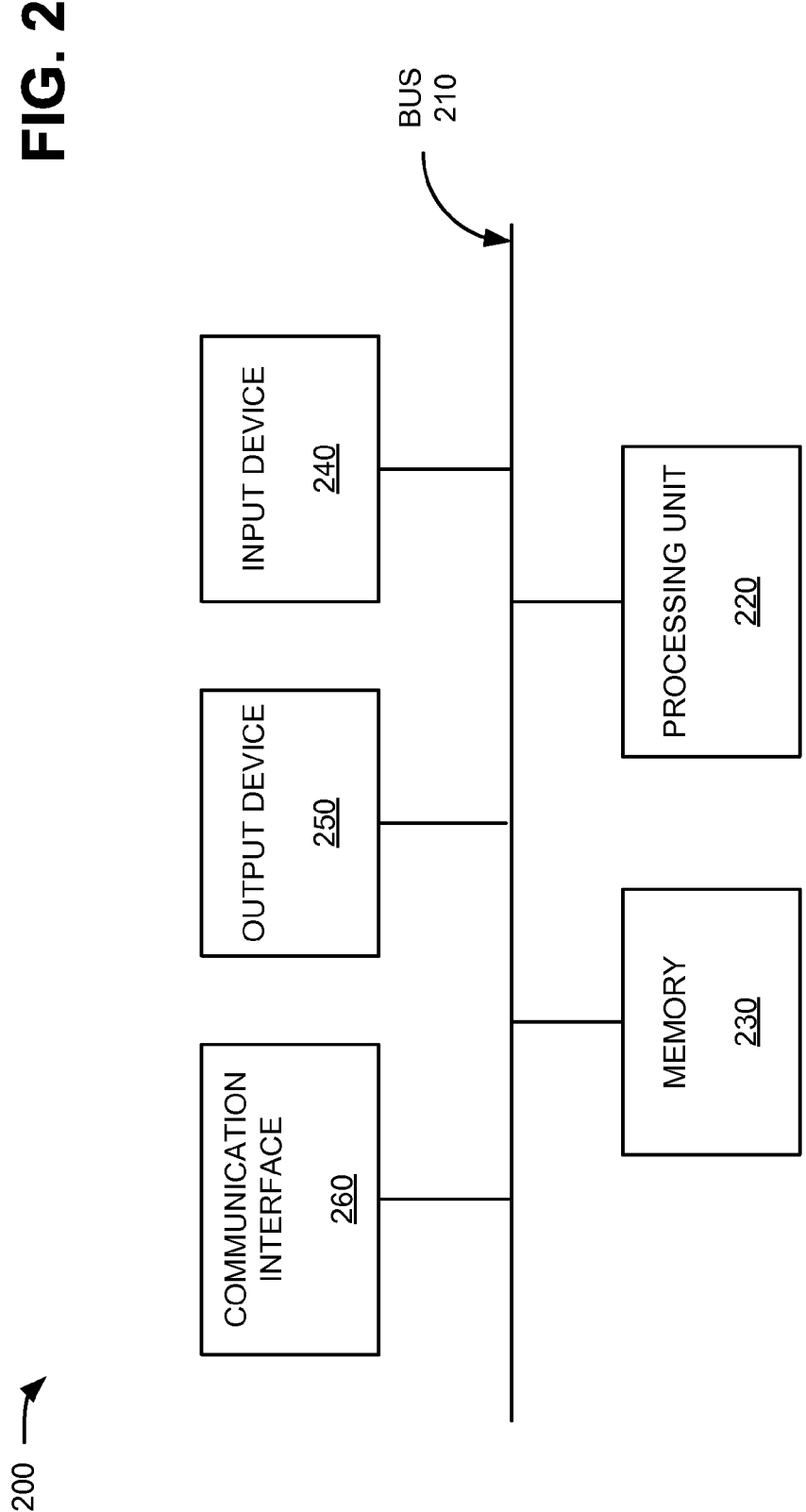
FIG. 2 is a block diagram of exemplary components of a device that may correspond to one of the devices of FIG. 1.

FIG. 2 is a diagram of exemplary components of a device 200 that may correspond to VCMS 110, content delivery system 112, DRM server 114, data center 120, catalog server 122, application server 124, profile server 130, billing server 140, physical content distribution system 150, customer support system 160, or third party device 170. Each of VCMS 110, content delivery system 112, DRM server 114, data center 120, catalog server 122, application server 124, profile server 130, billing server 140, physical content distribution system 150, customer support system 160, or third party device 170 may include one or more devices 200. As shown in FIG. 2, device 200 may include a bus 210, a processing unit 220, a memory 230, an input device 240, an output device 250, and a communication interface 260.

Bus 210 may permit communication among the components of device 200. Processing unit 220 may include one or more processors or microprocessors that interpret and execute instructions. In other implementations, processing unit 220 may be implemented as or include one or more application specific integrated circuits (ASICs), field programmable gate arrays (FPGAs), or the like.

Memory 230 may include a random access memory (RAM) or another type of dynamic storage device that stores information and instructions for execution by processing unit 220, a read only memory (ROM) or another type of static storage device that stores static information and instructions for the processing unit 220, and/or some other type of magnetic or optical recording medium and its corresponding drive for storing information and/or instructions.

Input device 240 may include a device that permits an operator to input information to device 200, such as a keyboard, a keypad, a mouse, a pen, a microphone, one or more biometric mechanisms, and the like. Output device 250 may include a device that outputs information to the operator, such as a display, a speaker, etc.

Communication interface 260 may include a transceiver that enables device 200 to communicate with other devices and/or systems. For example, communication interface 260 may include mechanisms for communicating with other devices, such as other devices of network 100.

As described herein, device 200 may perform certain operations in response to processing unit 220 executing machine-readable instructions contained in a computer-readable medium, such as memory 260. A computer-readable medium may include a non-transitory memory device. A memory device may include space within a single physical memory device or spread across multiple physical memory devices. The machine-readable instructions may be read into memory 260 from another computer-readable medium or from another device via communication interface 250. The machine-readable instructions contained in memory 260 may cause processing unit 220 to perform processes described herein. Alternatively, hardwired circuitry may be used in place of or in combination with machine-readable instructions to implement processes described herein. Thus, implementations described herein are not limited to any specific combination of hardware circuitry and machine-readable instructions.

Although FIG. 2 shows exemplary components of device 200, in other implementations, device 200 may include fewer components, different components, differently arranged components, or additional components than depicted in FIG. 2. As an example, in some implementations, input device 240 and/or output device 250 may not be implemented by device 200. In these situations, device 200 may be a "headless" device that does not explicitly include an input or an output device. Alternatively, or additionally, one or more components of device 200 may perform one or more other tasks described as being performed by one or more other components of device 200.

Figure 3:
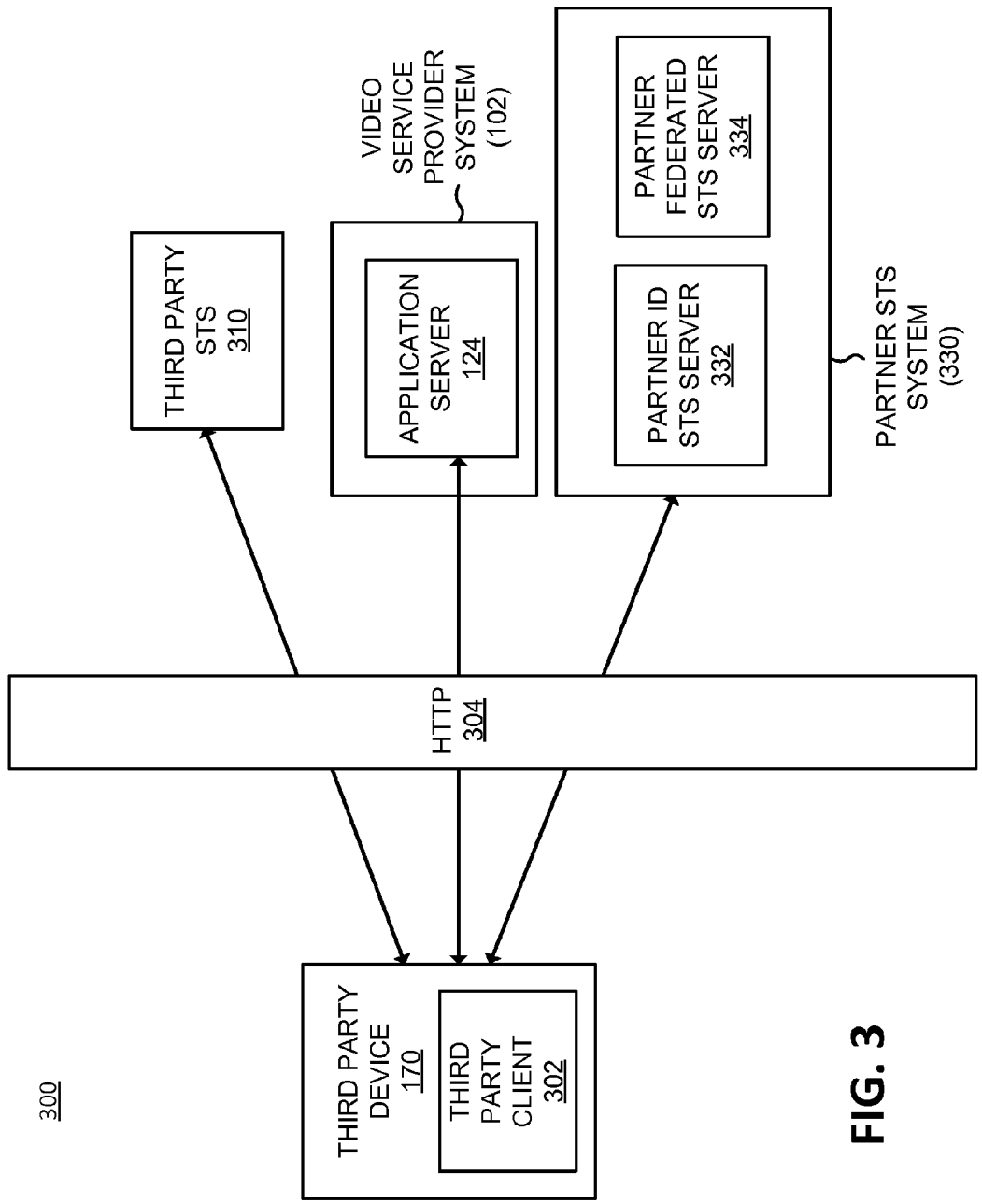
FIG. 3 is a block diagram of an authentication services architecture for a trusted third party device.

FIG. 3 is a diagram of an authentication services architecture 300 for a (trusted) third party device 170. As shown in FIG. 3, architecture 300 may include third party device 170, third party security token service (STS) 310, video service provider system 102, and partner STS system 330.

Third party devices 170 may be associated with the third party entity and include a third party client 302 (i.e., a client side application that includes machine readable instructions associated with and/or maintained by the third party entity). Third party client 302 may be maintained in a secure manner on third party device 170 (i.e., other applications may be barred from access to information and/or applications stored on third party device 170). Third party client 302 may enable third party device 170 to communicate with, for example, video service provider system 102 and/or present information received from video service provider system 102 to a user. Third party client 302 may permit a user of a third party device 170 to log into an account (e.g., via application server 124) or present authentication of an identity, access catalog information (e.g., from catalog server 122), submit an order, and/or consume live streaming video content (e.g., from VCMS 110).

Architecture 300 may include components of networks/systems that third party device 170 may interact with to receive trusted third party client authentication for access to services provided by video service provider system 102. Although only a single partner STS system 330 is shown, architecture 300 may include multiple partner STS systems 330 (e.g., each partner STS system 330 may be associated with federated customer accounts for different partner entities that map into video service provider system 102).

Third party STS 310 may provide authentication services for a third party user (i.e., a third party user account for a customer of the third party entity) and associated third party client 302 on third party device 170. A security token service may issue security tokens as part of a claims-based identity system (i.e., applications may receive access to the online video service based on a claim (communicated in the token) that the requesting application makes about itself or another object). For example, third party STS 310 may authenticate the third party user and provide a third party authorization token associated with the third party user to third party client 302 via public network 190 (HTTP 304). The third party authorization token may allow third party client 302 to place requests (e.g., for an SAML token, etc.) to third party STS 310. The SAML token may be an SAML 2.0 token.

Video service provider system 102 may be associated with a service provider entity and may provide digital services to third party users that have been authenticated and are subscribers of a video service, for example via a partner entity. Video service provider system 102, including DRM server 114 and content delivery system 112, may interface with third party device 170 via an HTTP 304 connection. Video service provider system 102 may receive requests for an online video session from third party client 302 and, if the third party user is currently associated with the partner entity, video service provider system 102 may provide the video online video services to third party client 302. Video service provider system 102 may manage customer service information, such as authorized devices, entitlement rights of digital contents, view preferences, and history of digital asset viewing and purchase. The customer service information may be accessed as an extension of partner customer accounts, i.e., the partner customer accounts may be viewed, effectively, as federated accounts in a federated database system.

Partner STS system 330 may provide authentication services associated with the partner entity. The partner entity may provide video services (from video service provider system 102) on a reseller basis. Customers may interact with a partner entity to subscribe to video services (e.g., the service provider entity may provide video services that are branded (or co-branded) by the partner entity). Partner STS system 330 may include partner ID STS server 332 and partner federated STS (FSTS) server 334.

Partner ID STS server 332 may be an ID provider that issues and validates identities associated with the partner entity. For example, partner ID STS server 332 may validate login credentials associated with the partner entity and encrypt a response for partner FSTS server 334.

Partner FSTS server 334 may include, or may provide access to, partner customer accounts. Partner customer accounts may include customer account information, such as contact names, email, addresses, billing, and subscription packages maintained by the partner entity in partner FSTS server 334.

Video service provider system 102 may assign a trusted status to third party device 170 (i.e., communications received from third party device 170 are presumed to be accurate (e.g., data provided is correct and non-corrupt) and secure (from other applications hosted on third party device 170)) based on a relationship with the third party entity (e.g., business relationship). Video service provider system 102 may approve third party device 170 for transactions that require a heightened security settings and rely on the presumed veracity of information provided by third party device 170. A third party user account may be linked (i.e., associated) with a partner entity user account to provide access to online video services. Third party user credentials may be used to authenticate third party device 170 for access to video content. The online video service may be delivered to a third party device 170 associated with a third party user based on trusted third party client authentication interaction (e.g., signal flows) between devices associated with different entities (i.e., service provider entity, third party entity, and/or partner entity), as described herein below with respect to signals flows 500 and 600 (FIGS. 5 and 6) and process 800 (FIG. 8).

Figure 4:
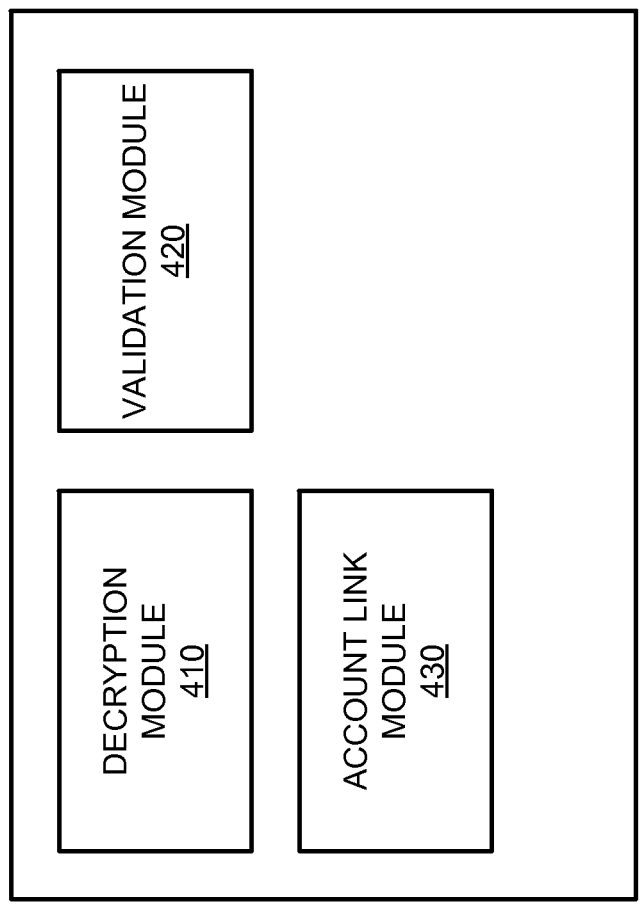
FIG. 4 is a diagram of exemplary functional components of the application server of FIG. 1.

FIG. 4 is a diagram of exemplary functional components of application server 124. In one implementation, the functions described in connection with FIG. 4 may be performed by one or more components of device 200 (FIG. 2). As shown in FIG. 4, application server 124 may include a decryption module 410, a validation module 420, and an account link module 430.

Decryption module 410 may decrypt assertions (i.e., packets of security information), such as those received from third party client 302, based on associated private keys. For example, decryption module 410 may receive SAML 2.0 tokens and decrypt the tokens based on the private key.

Validation module 420 may validate received SAML assertions using a third party public key associated with the third party entity.

Account link module 430 may search an account link table, such as account link table 700 described below with respect to FIG. 7 below, to determine whether an online video session is to be provided to third party client 302. Account link module 430 may provide an HTTP 200 OK message if third party client 302 is authenticated and authorized to receive online video services.

Figure 5:
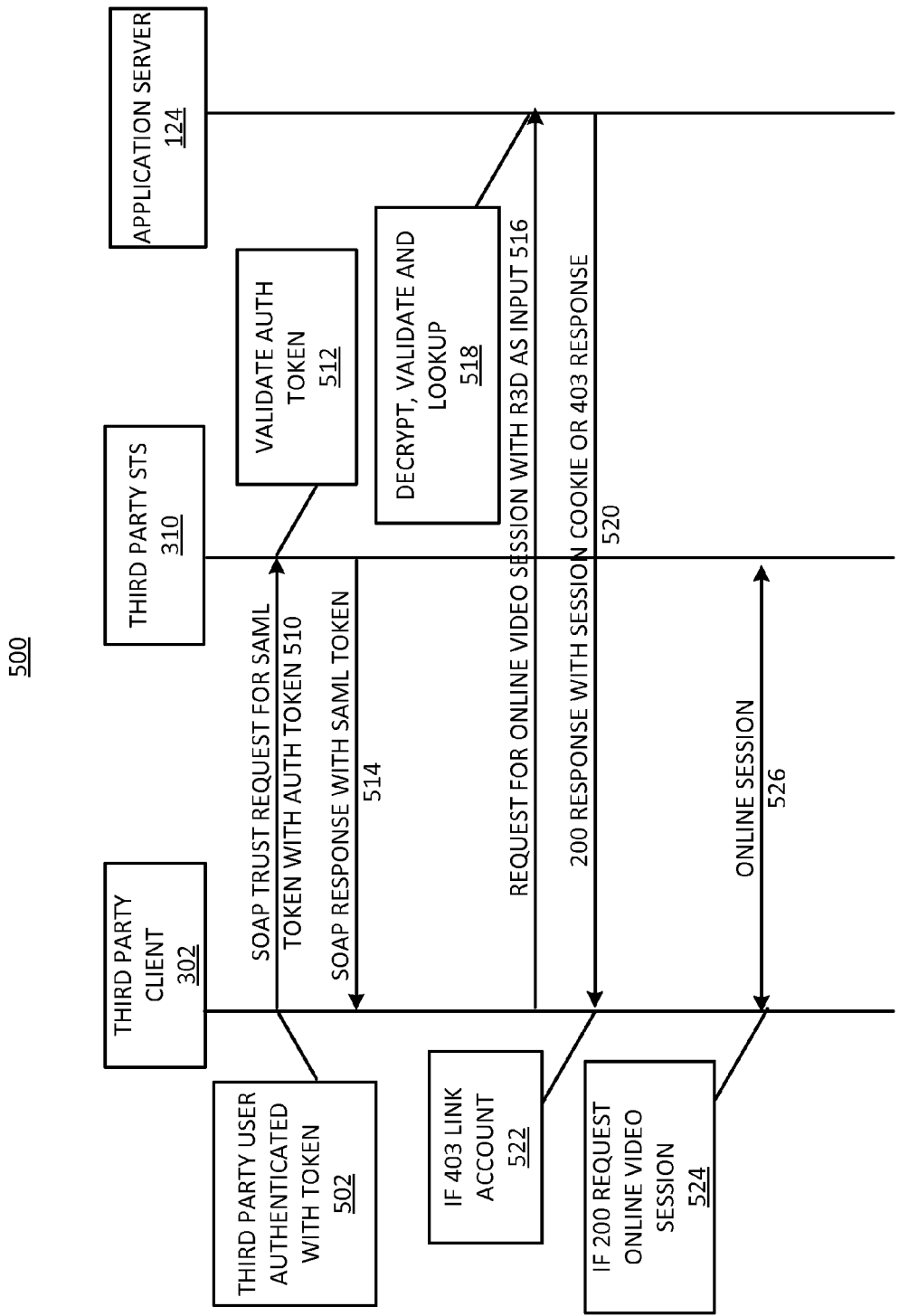
FIG. 5 is a signal flow diagram of exemplary messages implementing authentication of a trusted third party client.
Figure 6:
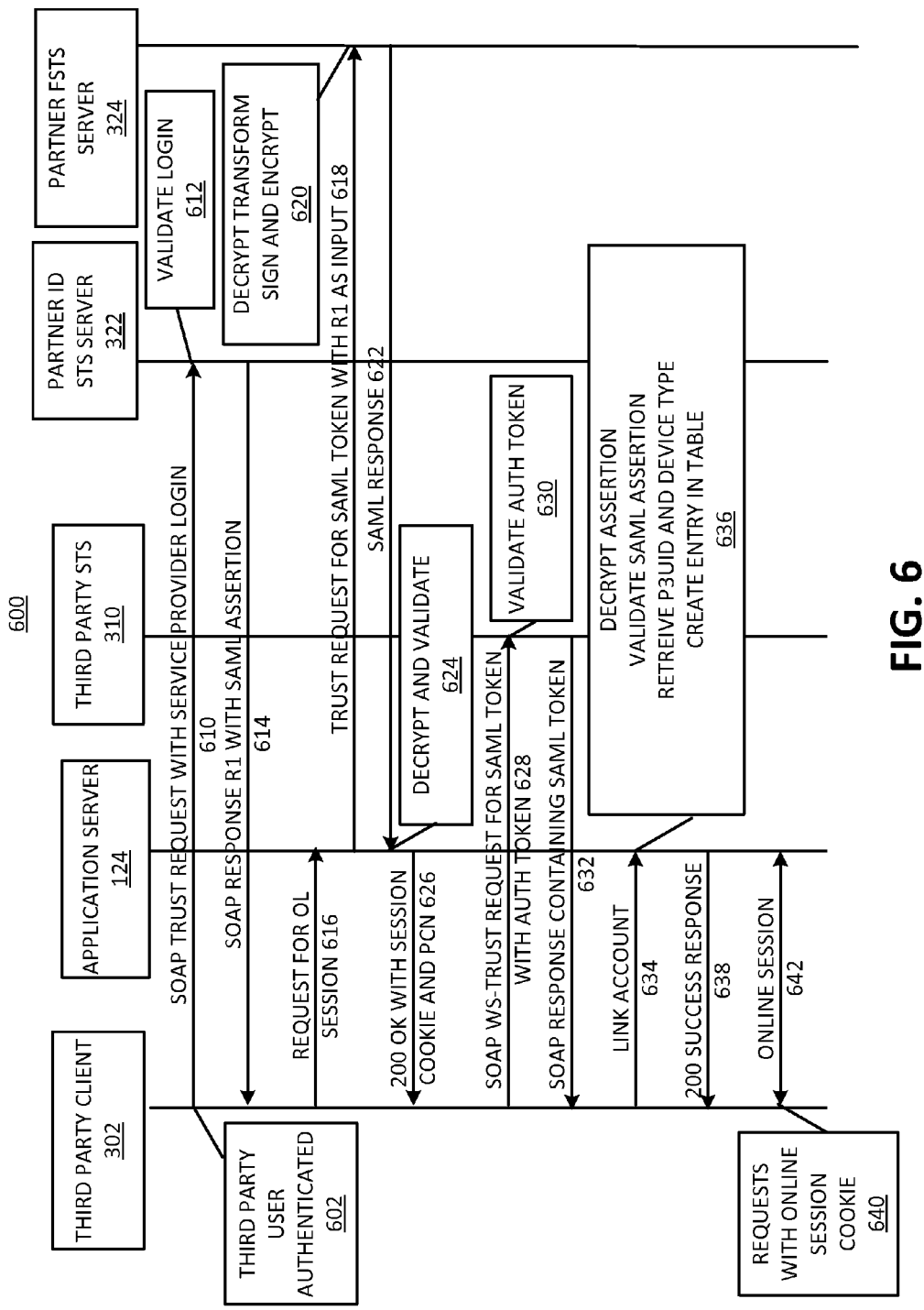
FIG. 6 is a signal flow diagram of exemplary messages implementing a onetime link with a trusted third party user account.

FIG. 5 is a signal flow diagram 500 of exemplary messages implementing authentication of a trusted third party client. FIG. 6 is a signal flow diagram 600 of exemplary messages implementing a one-time account link with a trusted third party user account. The particular arrangement and number of components in signal flow diagrams 500 and 600 as shown in FIGS. 5 and 6, respectively, is illustrated for simplicity. Signal flow diagrams 500 and 600 are described with reference to account link table 700, which is shown in FIG. 7.

As shown in FIG. 5, signal flow diagram 500 may include third party client 302, third party STS 310, and application server 124 (i.e., a security portion of video service provider system 102, such as described with respect to FIG. 1).

Third party client 302 may have been previously authenticated with third party STS 310 and may store a third party authorization token associated with the third party entity (502). For example, the user may have logged in to third party client 302 using third party login credentials. The third party authorization token may be stored in secure storage on third party device 170 (i.e., other applications may not be able to access the third party authorization token on third party device 170).

Third party client 302 may send a simple object access protocol (SOAP) web services (WS)-Trust request for an SAML token with the third party authorization token to third party STS 310 (510).

Third party STS 310 may receive the SOAP WS-Trust request and validate the third party authorization token (512). For example, third party STS 310 may decrypt the third party authorization token and validate the authorization token associated with the third party entity. Third party STS 310 may return a SOAP response (R3D, response associated with the third party entity) to third party client 302 (514). The SOAP response may contain the SAML token signed by third party STS 310 and encrypted for video service provider system 102.

Third party client 302 may send a request for a video with a token (R3D) encrypted for video service provider system 102 and signed by third party STS 310 (i.e., using a public key for video service provider system 102) as input to video service provider system 102 (i.e., a "create session" command) (516). The service provider account (i.e., a user account on video service provider system 102) may have been previously linked with the third party user account, e.g., as shown in signal flow 600 described with respect to FIG. 6.

Video service provider system 102 (e.g., application server 124) may determine a response to be provided to third party client 302 (518) (e.g., application server 124 may determine whether a 200 OK message is to be issued to third party client 302). For example, application server 124 may decrypt the SAML assertion inside the R3D token with a corresponding private key. Application server 124 may validate the SAML assertion with a third party public key (i.e., a token that allows a relying party (application server 124) to validate that the message was sent from the requested party (third party STS 310)) and retrieve a third party user identifier (P3UID), and a device type. P3UID is a user identifier associated with the third party entity. Application server 124 may search for a partner customer number (PCN) (i.e., a partner account number associated with the particular customer) and a link time from an account link account table 700 using P3UID. FIG. 7 illustrates exemplary information contained in account link table 700. As shown in account link table 700, each entry includes an authorization identifier (auth ID) 702, a PCN 704, a device type 706, and a link time 708.

Auth IDs 702 may include an ID associated with the partner entity for a third party user (e.g., P3UIDs 1-7). Auth ID 702 may store an authorization token that may be used for other device clients (device type 706). Each Auth ID 702 may include a variable number of characters (e.g., Auth IDs 702 may include 40 characters). The P3UID is unique with respect to third party user accounts and the third party application partner. The P3UID is also stable and immutable (i.e., not subject to change or deletion by subsequent applications that access the P3UID).

PCN 704 may be a large integer (i.e., a large number of unique users may be associated with the third party entity and/or partner entity and therefore a "bigint" (non-null value) may be selected for PCN 704 in structured query language (SQL)). PCN 704 may be issued by the partner entity.

Device type 706 may be a small integer (i.e., a small number of device types may be associated with the third party entity and/or partner entity and therefore a "smallint" (non-null value) may be selected for device type 706 in SQL).

Link time 708 may include a time stamp that indicates time that a third party login is linked with an account on video service provider system 102.

With reference back to FIG. 5, at process 518, application server 124 may search account link table 700 for a PCN and, return a response based on the PCN (520). For example, if the PCN is not found, application server 124 may return an HTTP status 403 message (i.e., a denial message) to third party client 302. If third party client 302 receives a 403 message, third party client 302 may link the customer accounts for the service provider entity and the third party entity (as shown in FIG. 6 and signal flow diagram 600 below) (522). If application server 124 finds the PCN (e.g., PCN C), application server 124 may access customer profile information and identify a password change timestamp (PCT) associated with the customer. If the PCT is later than (a corresponding value of) link time 708, application server 124 may delete the entry from account link table 700 and return an HTTP status 403 message to third party client 302. If the PCT is not later than link time 708, application server 124 may return HTTP status 200 and PCN to third party client 302.

If third party client 302 receives a 200 OK message, third party client 302 may send a request for an online video session that includes an online video session cookie (524). Third party client 302 may initiate an online video session from video service provider system 102 (526).

With reference now to FIG. 6, signal flow diagram 600 may include third party client 302, third party STS 310, application server 124, partner ID STS server 332 and partner federated STS server 334.

Third party client 302 may have previously authenticated third party user with third party STS 310 and may have a third party authorization token. Third party client 302 may initiate a process to form a onetime link account between a third party user account and an account associated with the service provider entity. Third party client 302 may display a login screen and collect service provider login credential (process 602). For example, third party client 302 may generate a graphical user interface (GUI) for the user to enter service provider login credentials. The user may have previously signed up for a (service provider) user account or may sign up for the user account using a web client.

Third party client 302 may send a SOAP WS-Trust request with service provider login credential as an input to partner ID STS server 332 (610).

Partner ID STS server 332 may validate the service provider login credentials (process 612). Partner ID STS server 332 may send a SOAP response (R1) to third party client 302 with SAML assertion signed by partner ID STS server 332 and encrypted for partner federated STS server 334 (signal flow 614).

Third party client 302 may send a request for an online session with R1 as input to application server 124 (create session) (616). Application server 124 may send a WS-Trust Request for SAML token using R1 as input to partner federated STS server 334 (618). Partner federated STS server 334 may decrypt the SAML token in R1, validate the SAML token, transform the SAML token, sign and encrypt the SAML token for Application server 124 (i.e., video service provider system 102) (process 620). Partner federated STS server 334 may send a SAML response to application server 124 (622).

Application server 124 may decrypt and validate the received SAML response to determine whether an online session is to be provided to third party client 302 (process 624). For example, Application server 124 may decrypt the assertion inside the response with the corresponding private key of the application server 124. Application server 124 may validate the SAML assertion and retrieve PCN. Application server 124 may create an online session and link the PCN to the online session. Application server 124 may provide an HTTP 200 response with session cookie and PCN to third party client 302 (signal flow 626). After signal flow 626 is complete, the user has been logged in with third party login credentials.

Third party client 302 may send a SOAP WS-Trust request for SAML token with third party authorization token to third party STS 310 (628). Third party STS 310 may validate third party authorization token (630). Third party STS 310 may send a SOAP response (R3D) containing SAML token signed by third party STS 310 and encrypted for application server 124 to third party client 302 (632). Third party client 302 may send a request to link accounts using R3D as an input (i.e., a "link account" command) to application server 124 (634).

Application server 124 may decrypt and validate the received SAML response and create an entry in account link table 700 (636). For example, application server 124 may decrypt assertion inside R3D with its private key. Application server 124 may validate SAML assertion and retrieve P3UID and device type. P3UID may be unique with respect to third party user accounts and partner accounts, stable and immutable. Application server 124 may create an entry in account link table 700. For example, application server 124 may create an entry in account link table 700 that includes an auth ID 702 (i.e., P3UID), a corresponding PCN 704, a device type 706, and a link time 708. Application server 124 may send an HTTP 200 OK response (i.e., a success response) to third party client 302 (638). The receipt of the HTTP 200 success response completes a link between third party client 302 and video service provider system 102. Third party client 302 may then send requests for online video sessions with an online video session cookie to video service provider system 102 (640). Video service provider system 102 may provide the online video session (642).

FIG. 8 is a flow chart of an exemplary process for implementing authentication of a trusted third party client according to implementations described herein. In one implementation, process 800 may be performed by application server 124. In another implementation, some or all of process 800 may be performed by another device or group of devices, including or excluding application server 124.

As shown in FIG. 8, application server 124 may receive a request for an online session with R3D (i.e., a request signed by third party STS 310) as input from third party client 302 (block 802). R3D may have been encrypted for application server 124. R3D may contain a third party user ID and P3UID. Application server 124 may decrypt assertion inside R3D with the private key for application server 124 (block 804). The third party user ID and the partner customer number are encrypted based on a public key of application server 124 (i.e., video service provider system 102).

Application server 124 may validate the assertion with third party public key and retrieve P3UID and device type (block 806). Application server 124 may search for a PCN and link time based on P3UID (block 808). For example, application server 124 may search account link account table 700 using P3UID.

Application server 124 may return a 403 message to third party client 302 if P3UID is not found (block 810). However, if application server 124 finds P3UID in account link account table 700, application server 124 may retrieve a PCT corresponding to a time that the user linked the third party user account and the service party user account, for example based on customer profile information retrieved from profile server 130 (block 812). Application server 124 uses the PCT to identify whether there has been a password change subsequent to the link between the third party user account and the service party user account.

At block 814, application server 124 may determine whether the PCT is later than the link time. If the PCT is later than the link time, application server 124 may return HTTP status 403 to third party client 302 and delete the P3UID entry from account link account table 700 (block 816). Third party client 302 may then be forced to relink, including providing appropriate passwords, as described with respect to signal flow diagram 600 and FIG. 6.

If PCT is not later than the link time (block 814—no), application server 124 may return a 200 OK message and the PCN to third party client 302. Third party client 302 may then request an online video session from video service provider system 102.

Systems and/or methods described herein may allow authentication of a trusted third party client. Additionally, an architecture of an authentication system that includes security token services associated with a service provider entity, a partner entity and a third party entity is shown. Although implementations are mainly described with respect to online video sessions, other implementations may be used to set up other types of sessions/access other types of information.

In the preceding specification, various preferred embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense. For example, while series of blocks have been described with respect to FIG. 8, the order of the blocks may be modified in other implementations. Further, non-dependent blocks may be performed in parallel.

It will be apparent that different aspects of the description provided above may be implemented in many different forms of machine-readable instructions, firmware, and hardware in the implementations illustrated in the figures. The actual machine-readable instructions or specialized control hardware used to implement these aspects is not limiting of the invention. Thus, the operation and behavior of these aspects were described without reference to the specific machine-readable instructions—it being understood that machine-readable instructions and control hardware can be designed to implement these aspects based on the description herein.

Further, certain portions of the invention may be implemented as a "component" or "system" that performs one or more functions. These components/systems may include hardware, such as a processor, an ASIC, or a FPGA, or a combination of hardware and machine-readable instructions.

No element, act, or instruction used in the present application should be construed as critical or essential to the invention unless explicitly described as such. Also, as used herein, the article "a" and "one of" is intended to include one or more items. Further, the phrase "based on" is intended to mean "based, at least in part, on" unless explicitly stated otherwise.

What is claimed is:

1. A computer-implemented method comprising:
   receiving, at a video service provider system, a request for an online video session from a third party device with a security markup assertion language (SAML) token as an input, wherein the SAML token is encrypted for the video service provider system and signed by a third party security token service (STS) device, and the third party device is associated with a third party user account and a third party entity;
   decrypting a SAML assertion in the SAML token with a private key associated with the video service provider system;
   validating the SAML assertion based on a third party public key associated with the third party STS device;
   retrieving a third party account user identifier (ID) and a device type from an account link table wherein the account link table includes an authorization identifier, the third party account user ID, the device type, and a link time, wherein the link time identifies a time that the third party user account was linked with a service provider user account associated with the video service provider system;
   identifying the link time based on the third party account user identifier;
   identifying a password change time (PCT) stamp associated with the service provider user account; and
   providing the online video session to the third party device in response to determining that the PCT stamp is not later than the link time.

2. The computer-implemented method of claim 1, further comprising:
   providing notification that the third party user account is not linked with the service provider user account in response to determining that the PCT stamp is later than the link time.

3. The computer-implemented method of claim 1, wherein providing the online video session to the third party device further comprises:
   providing a success response and a session cookie to the third party device.

4. The computer-implemented method of claim 1, further comprising:
   receiving a SAML response from a partner federated STS (FSTS) device, wherein the SAML response includes the SAML assertion signed by a partner identity (ID) STS device and encrypted for the FSTS device;
   decrypting the SAML assertion with the private key associated with the video service provider system;
   validating the SAML assertion based on the third party public key associated with the third party STS device;
   retrieving a party account number associated with the third party user account;
   creating the online video session; and
   associating the online video session to the party account number.

5. The computer-implemented method of claim 4, further comprising:
   receiving a link account request from the third party device, wherein the link account request includes a SAML token signed by the third party STS device and encrypted for the video service provider system;
   decrypting the SAML assertion with the private key associated with the video service provider system;
   validating the SAML assertion based on a third party public key associated with the third party STS device;
   retrieving the third party account user ID and the device type; and
   creating an entry in the account link table based on the third party account user ID and the party account number.

6. The computer-implemented method of claim 5, wherein creating an entry in an account link table further comprises:
   identifying the third party user ID, the party account number, the device type, and the link time.

7. The computer-implemented method of claim 1, wherein the SAML token is a SAML 2.0 token.

8. The computer-implemented method of claim 1, further comprising:
   authenticating the SAML token based on a web services (WS) trust protocol.

9. The computer-implemented method of claim 1, further comprising:
   encrypting the third party account user identifier, and a party account number based on a public key of the video service provider system.

10. A computer-implemented method comprising:
sending, from a third party device, a simple object access protocol (SOAP) web services (WS) trust request including service provider login credentials associated with a service provider user account to a partner identity (ID) STS device, wherein the third party device is associated with a third party entity and a third party user account and the partner ID STS device is associated with a partner entity of a service provider entity that manages a video service provider system;
receiving a SOAP response including an a security assertion markup language (SAML) assertion signed by the partner ID STS device and encrypted for a partner federated STS (FSTS) device after the partner ID STS device validates the service provider login credentials;
sending a request for an online video session to the video service provider system; wherein the video service provider system is to decrypt and validate the SAML assertion, lookup the third party user account from an account link table, wherein the account link table includes an authorization identifier, a third party account user identifier, a device type, and a link time, wherein the link time identifies a time that the third party user account was linked with a service provider user account associated with the video service provider system, identify the link time based on the third party account user identifier, identify a password change time (PCT) stamp associated with the service provider user account and provide the online video session to the third party device in response to determining that the PCT stamp is not later than the link time; and
receiving a success response and a session cookie.

11. The computer-implemented method of claim 10, further comprising:
sending, from the third party device, a request for a SAML token with a third party authorization token to a third party security token service (STS), wherein the third party STS provides authentication in association with the third party device;
receiving a response including the requested SAML token, wherein the third party STS provides the requested SAML token after validation of the third party authorization token and the requested SAML token is signed by the third party STS and encrypted for the video service provider system;
sending a link account request including the requested SAML token to the video service provider system; and
receiving a second success response and the session cookie.

12. The computer-implemented method of claim 11, further comprising:
requesting an online video session with the requested SAML token as an input from the video service provider system; and
receiving another success response and a session cookie if the video service provider system determines that the third party user account is associated with a currently linked service provider user account.

13. The computer-implemented method of claim 12, further comprising:
receiving a denial message if the video service provider system determines that the third party user account is not associated with a currently linked service provider user account.

14. A video service provider device, comprising:
a memory to store a plurality of instructions; and
a processor configured to execute instructions in the memory to:
receive a request for an online video session from a third party device, with a security assertion markup language (SAML) token as an input, wherein the SAML token is encrypted for the video service provider device and signed by a third party security token service (STS) device, and the third party device is associated with a third party user account and a third party entity;
decrypt a SAML assertion in the SAML token with a private key associated with the video service provider device;
validate the SAML assertion based on a third party public key associated with the third party STS device;
retrieve a third party account user identifier (ID) and a device type from an account link table, wherein the account link table includes an authorization identifier, the third party account user ID, the device type, and a link time, wherein the link time identifies a time that the third party user account was linked with a service provider user account associated with the video service provider device;
identify a link time based on the third party account user identifier;
identify a password change time (PCT) stamp associated with the service provider user account; and
provide the online video session to the third party device in response to determining that the PCT stamp is not later than the link time.

15. The new video service provider device of claim 14, wherein the processor is further configured to:
receive another request for an online video session with a third party token encrypted for the video service provider device from the third party device, wherein the third party token includes a second SAML assertion signed by a partner identity (ID) STS device and encrypted for a partner federated STS (FSTS) device;
send a simple object access protocol (SOAP) web services (WS) trust request, including the second SAML assertion signed by the partner ID STS device and encrypted for the partner FSTS device, to the partner FSTS device;
receive a SAML response from the partner FSTS device, wherein the SAML response includes the second SAML assertion;
decrypt the second SAML assertion with a private key associated wit the video service provider device;
validate the second SAML assertion based on a third party public key associated with a third party STS device;
retrieve a party account number associated with a third party account;
create the online video session;
associate the online video session with the party account number; and
send success response with a session cookie to the third party device.

16. The video service provider device of claim 15, wherein the processor is further configured to:
receive a link account request including a SAML assertion signed by a third party STS device and encrypted for the video service provider device;
decrypt the SAML assertion with a private key associated with the video service provider device;
validate the SAML assertion based on a third party public key associated with the third party STS device;

retrieve a third party account user ID and a device type; and
create an entry in the account link table based on the third party account user ID and a party account number.

17. The video service provider device of claim 16, wherein, when creating the entry in the account link table, the processor is further configured to:
identify the third party account user ID, the party account number, the device type of the third party device, and the link time.

18. The video service provider device of claim 14, wherein the processor is further configured to:
provide notification that the third party user account is not linked with the service provider user account if the PCT stamp is later than the link time.

19. A system, comprising:
a third party security token service (STS) device that provides security tokens associated with a third party entity; and
a video service provider system that provides an online video service and is associated with a service provider entity; and
wherein the third party STS device is configured to
receive a simple object access protocol (SOAP) web services (WS) trust request for a security markup assertion language (SAML) token with a third party authorization token from a third party device, wherein the third party device is associated with a third party user account and a third party entity; and
validate the authorization token and provide a SOAP response including a requested SAML token and SAML assertion signed by the third party STS device and encrypted for the video service provider system; and
wherein the video service provider system is configured to
receive a request for an online video session from the third party device,
decrypt and validate the SAML assertion,
lookup the third party user account from an account link table, wherein the account link table includes an authorization identifier, a third party account user identifier, a device type, and link time, wherein the link time identifies a time that the third party user account was linked with a service provider user account associated with the service provider system;
identify a link time based on a third party account user identifier,
identify a password change time (PCT) stamp associated with the service provider user account, and
return a success response and a session cookie to the third party device if the video service provider system determines that the third party user account is associated with a currently linked service provider user account.

20. The system of claim 19, further comprising:
a partner identity (ID) STS device that provides security tokens associated with a partner entity of the service provider entity; and
a partner federated STS (FSTS) device that manages a partner customer account associated with the video service provider system; and
wherein the partner ID STS device is configured to receive another SOAP WS trust request including service provider login credentials associated with a identified service provider user account from the third party device;
validate the service provider login credentials, and
provide a SOAP response including an SAML assertion signed by the partner ID STS device and encrypted for the partner FSTS device to the third party device;
wherein the video service provider system is further configured to receive a link account request including the requested SAML token from the third party device;
send a further SOAP WS trust request to the partner FSTS device;
receive a SAML response from the partner FSTS device; and
send a second HTTP 200 response and a session cookie to the third party device.

* * * * *